(12) United States Patent
Nicolas

(10) Patent No.: X6600
(45) Date of Patent: Jun. 13, 1831

(54) PLANTS, INSECTS, &C., MODE OF DESTROYING

(76) Inventor: Joseph Nicolas

Joseph Nicolas

Letters Patent

The Schedule referred to in these Letters Patent and making part of the same containing a description in the words of the said Joseph Nicolas of his improvement in the method of destroying plants in-sects or other animals noxious to the planters and particularly the noxious plants known by the names of coco amer grapmel souchet amer cipeuus tuberous acis hydra.

Specification of Joseph Nicolas' new method of destroying noxious plants insects or other animals and particular the noxious plant known by the names of coco amer grapmel souchet amer cipeuus tuberous acis hydra — It consists 1st In ploughing the field infested with the above noxious plants insects or other animals to the depth of eight or ten inches more or less according to the soil. 2nd In a carriage moved by steam or other power upon which a steam boiler is fixed to which boiler is adapted a force pump moved by steam or otherwise to convey water in. the boiler and one or several pipes to convey the steam from the boiler to any described portion of the surface ploughed: the heat of the steam instantaniously effects the destruction intended. If the first aspersion or sprinkling be not sufficient in obtaining the desired effect (which is very seldom the case) the ploughing and sprinkling of steam must be repeated.

Witnesses
[illegible].
Jona. Beauvais fils (Jos. h. Nicolas)

264 [illegible]

[illegible]